Nov. 24, 1925.
C. BELCHER
1,562,676
DEMOUNTABLE RIM
Filed May 28, 1923
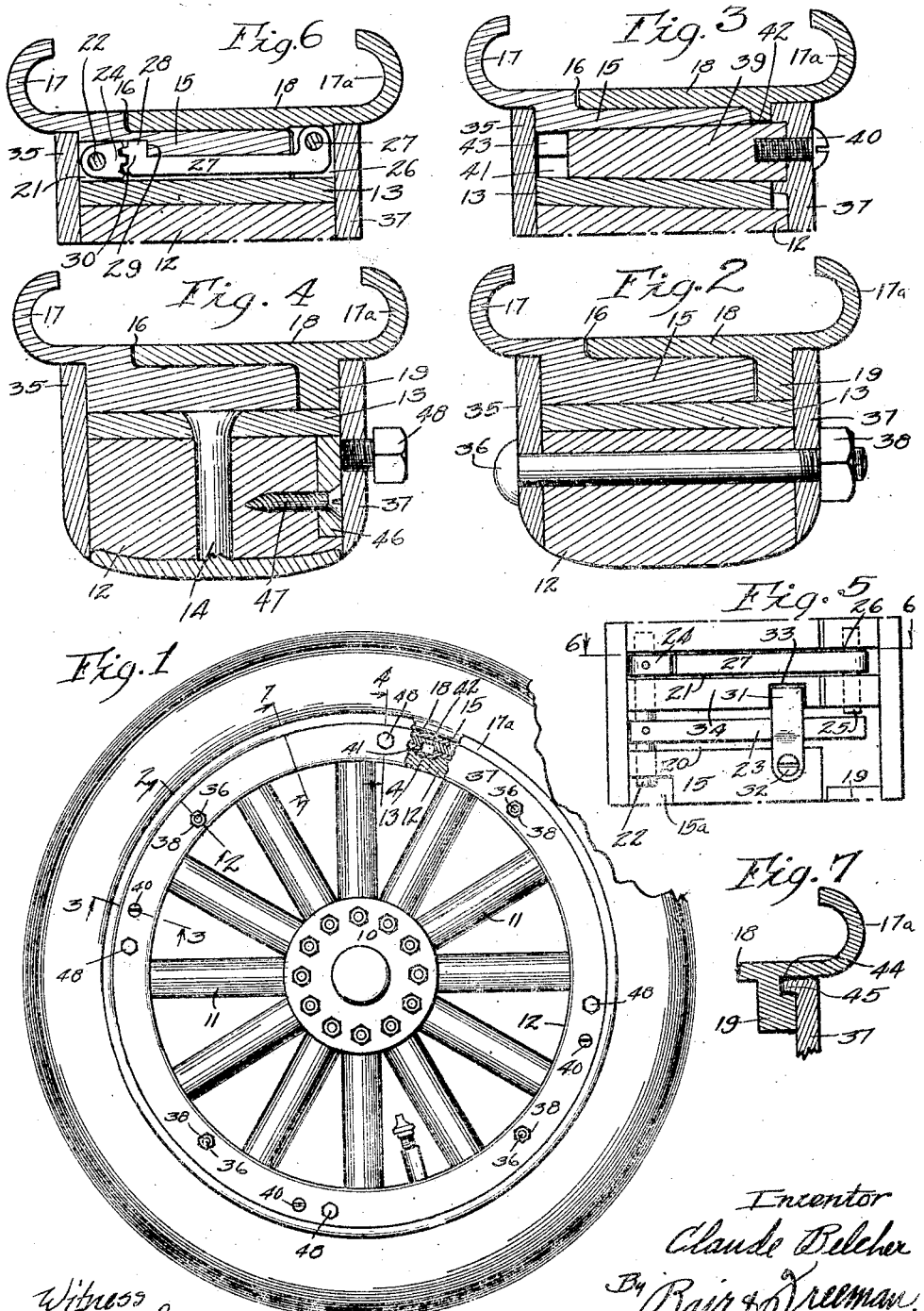

Patented Nov. 24, 1925.

1,562,676

UNITED STATES PATENT OFFICE.

CLAUDE BELCHER, OF DES MOINES, IOWA.

DEMOUNTABLE RIM.

Application filed May 28, 1923. Serial No. 641,896.

*To all whom it may concern:*

Be it known that I, CLAUDE BELCHER, a citizen of the United States, and a resident of Des Moines, in the county of Polk and State of Iowa, have invented a certain new and useful Demountable Rim, of which the following is a specification.

The object of my invention is to provide a demountable rim of novel structure, which is simple, durable and inexpensive to manufacture.

With this and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a wheel equipped with a demountable rim embodying my invention on which is a pneumatic tire, part of the structure being broken away and part being shown in section.

Figure 2 shows a sectional view taken on the line 2—2 of Figure 1.

Figure 3 shows a sectional view taken on the line 3—3 of Figure 1.

Figure 4 is a sectional view taken on the line 4—4 of Figure 1.

Figure 5 is an inverted plan view of part of the demountable rim, illustrating the means for fastening the two parts thereof together.

Figure 6 shows a detailed, sectional view taken on the line 6—6 of Figure 5; and Figure 7 is a detailed, sectional view taken on the line 7—7 of Figure 1.

In the accompanying drawings, I have used the reference numeral 10 to indicate generally a wheel, having the spokes 11 and the felloe 12.

A metal plate 13 is secured to the outer face of the felloe and is held in position by rivets 14.

My improved demountable rim comprises the annular plate or strip or rim member 15, having in its outer surface the rabbet 16, as shown for instance in Figure 2.

At one edge, the rim member 15 has the flange 17 for engaging the bead on a clincher tire. The form of the flange 17 would be modified appropriately for a straight side tire.

The coacting rim member has the annular plate or member 18 provided at one edge with the tire engaging flange 17ª corresponding to the flange 17. On its inner or under side and near its outer edge, the member 18 has an annular rib 19.

The rim member 18 is designed to be received in the rabbet 16 of the rim member 15.

For holding the rim members 15 and 18 together when the rim is used as a spare, and while it is being installed, I provide the following means:

On the inner side of the rim member 15 are transverse recesses 20 and 21 shown in Figure 5. Mounted in the body of the rim member 15 and extending across the recesses 20 and 21 near the flange 17 is a pintle 22 shown in said Figure 5.

The member 15 has a groove 15ª to permit the insertion of the pintle 22.

Fixed to the pintle 22 is a handle 23, which may rest in the recess 20 or be withdrawn therefrom for the purpose of rotating the pintle 22. On the pintle 22 in the recess 21 is a toothed segment 24.

Mounted on a pin 25 extending across a recess 26 in the rib 19 is a locking arm 27, which may extend transversely across the inner side of the demountable rim and has at its free end a projecting portion 28 designed to engage a shoulder 29 formed on the inner side of the rim member 15 as shown in Figure 6.

The free end of the locking arm 27 has notches 30 to coact with the teeth of the segment 24. When the teeth of the segment 24 and the notches of the locking arm 27 are engaged as shown in Figure 6, the handle 23 is received in the recess 20. The handle 23 is locked in the recess 20 by means of a locking plate 31, pivoted as at 32 to the inner side of the rim member 15 and made of spring material.

The locking plate 31 when in locking position as shown in Figure 5 has its free end received in a notch 33 in the transverse rib 34 formed by the material of the inner side of the rim member 15 between the recesses 20 and 21.

When it is desired to release the two rim members from their engagement with each other, the user lifts the free end of the spring locking plate 31 out of the notch 33 and swings the plate around until it clears the handle 23. The handle 23 is then swung over for rotating the pintle 22.

The toothed segment 24 during such rotation swings the free end of the locking arm 27 away from engagement with the shoulder 29.

The two rim members may then be readily taken apart.

As many of these locking devices may be provided as is necessary.

For locking the demountable rim on the felloe, I have provided the following means:

The demountable rim is slipped onto the felloe and an annular plate 35 is placed on the inner side of the felloe overlapping the felloe and the rim member 15, as shown in Figures 2 and 3.

A series of bolts 36 extend through the plate 35 and the felloe.

On the opposite side of the felloe is a similar plate 37 through which the bolts 36 extend. On the bolts 36 are removable nuts 38. On the plate 37, I mount a series of projecting lugs 39 by means of screws 40.

The plate 13, rib 19 and rim member 15 are provided with coacting grooves 41, 42 and 43 as illustrated in Figure 3 to receive the lugs 39.

Inset in the side face of the felloe 12, adjacent to the plate 37 are small wear plates 46 held in place by screws 47.

Mounted in the plate 37 for registration with the respective plates 46 are short screw bolts 48 which may be screwed against the plates 46 for forcing the plates 37 away from the felloe, if the lugs 39 should stick.

The plate 37 is provided on its inner face with an inwardly projecting lug 44, which fits into a recess 45 in the annular rib 19 on the rim member 18 as illustrated in Figure 7.

Some changes may be made in the construction and arrangement of my improved demountable rim, and it is my intention to cover by my claims, any modified forms of structure and use of mechanical equivalents, which may be reasonably included within their scope.

I claim as my invention:

1. In a demountable rim, a rim member having a tire engaging flange and having a rabbet in its outer surface, a second rim member received in said rabbet and having a tire engaging flange, means for detachably locking said rim members together, said means including a locking arm pivoted to one of said rim members and having a projecting member at its free end, the other of said rim members having a shoulder for coacting with said projecting member, a rocking pintle mounted on the other of said rim members, said pintle and said locking arm having coacting engaging means, and means for locking said pintle in one position of its movement.

2. In a demountable rim, a rim member having a tire engaging flange and having a rabbet in its outer surface, a second rim member received in said rabbet and having a tire engaging flange, means for detachably locking said rim members together, said means including a locking arm pivoted to one of said rim members and having a projecting member at its free end, the other of said rim members having a shoulder for coacting with said projecting member, a rocking pintle mounted on the other of said rim members, said pintle and said locking arm having coacting engaging means, and means for locking said pintle in one position of its movement, comprising a handle fixed to said pintle, said last-named rim member having a recess for receiving said handle, and means for holding said handle in said recess.

Des Moines, Iowa, May 17, 1923.

CLAUDE BELCHER.